(12) United States Patent
Han et al.

(10) Patent No.: US 11,582,510 B2
(45) Date of Patent: *Feb. 14, 2023

(54) METHODS, DEVICES, AND SYSTEMS FOR EMBEDDING VISUAL ADVERTISEMENTS IN VIDEO CONTENT

(71) Applicant: AT&T Intellectual Property I, L.P., Atlanta, GA (US)

(72) Inventors: Bo Han, Bridgewater, NJ (US); Sassan Pejhan, Princeton, NJ (US); Zhengye Liu, Pleasanton, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/241,323

(22) Filed: Apr. 27, 2021

(65) Prior Publication Data
US 2021/0250646 A1 Aug. 12, 2021

Related U.S. Application Data

(63) Continuation of application No. 16/213,585, filed on Dec. 7, 2018, now Pat. No. 11,032,607.

(51) Int. Cl.
*H04N 21/40* (2011.01)
*H04N 13/383* (2018.01)
(Continued)

(52) U.S. Cl.
CPC . *H04N 21/44016* (2013.01); *H04N 21/41407* (2013.01); *H04N 21/4223* (2013.01); *H04N 21/44218* (2013.01); *H04N 21/812* (2013.01)

(58) Field of Classification Search
CPC .............................. H04N 21/235; H04N 21/20
See application file for complete search history.

(56) References Cited

U.S. PATENT DOCUMENTS 8,264,544 B1 9/2012 Chang et al.
8,369,686 B2 2/2013 Mei et al.
(Continued)

FOREIGN PATENT DOCUMENTS

| WO | 2011031968 A1 | 3/2011 |
| WO | 2018021707 A1 | 2/2018 |
| WO | 2018035133 A1 | 2/2018 |

OTHER PUBLICATIONS

Mobile vs Desktop Video: How do they compare? https://www.linkedin.com/pulse/mobile-vs-desktop-video-how-do-compare-freddie-benjamin; Aug. 20, 2015; pp. 1-4.
(Continued)

*Primary Examiner* — Mushfikh I Alam
(74) *Attorney, Agent, or Firm* — Guntin & Gust, PLC; Kenneth S. Kwan

(57) ABSTRACT

Aspects of the subject disclosure may include, for example, embodiments include obtaining video content, the video content comprises a plurality of frames, monitoring, by an image sensor, a facial feature of a user to determine a visual focus of the user in relation to the video content, and detecting from a group of frames of the plurality of frames at least a reduction in movements of objects in the group of frames. Further embodiments include determining, according to the monitoring and the detecting, a measure of attention of the user within a region of the group of frames, determining that the measure of attention of the user within the region of the group of frames satisfies a threshold, and embedding in at least a portion of subsequent frames of the plurality of frames a visual advertisement in the region via a communication device. Other embodiments are disclosed.

20 Claims, 14 Drawing Sheets

(51) Int. Cl.
*H04N 21/44* (2011.01)
*H04N 21/442* (2011.01)
*H04N 21/414* (2011.01)
*H04N 21/81* (2011.01)
*H04N 21/4223* (2011.01)

(56) References Cited

U.S. PATENT DOCUMENTS

| | | |
|---|---|---|
| 8,751,301 B1 | 6/2014 | Chau |
| 9,088,823 B1* | 7/2015 | Price .................. H04N 21/4667 |
| 9,363,569 B1 | 6/2016 | van Hoff et al. |
| 9,467,750 B2 | 10/2016 | Banica et al. |
| 9,536,251 B2 | 1/2017 | Chang et al. |
| 9,778,740 B2 | 10/2017 | Rantakokko et al. |
| 9,881,584 B2 | 1/2018 | Dakss et al. |
| 10,354,291 B1 | 7/2019 | Teller |
| 2006/0256133 A1 | 11/2006 | Rosenberg et al. |
| 2010/0312608 A1 | 12/2010 | Shan et al. |
| 2011/0206283 A1* | 8/2011 | Quarfordt ............ G06V 40/193 382/220 |
| 2012/0089488 A1* | 4/2012 | Letchford .............. G06Q 30/02 705/27.2 |
| 2014/0156364 A1* | 6/2014 | Zalewski ......... H04N 21/43072 382/181 |
| 2014/0195328 A1* | 7/2014 | Ferens ............... G06Q 30/0271 705/14.67 |
| 2014/0380355 A1 | 12/2014 | Hellier et al. |
| 2016/0142792 A1* | 5/2016 | Lee ..................... G06K 9/6215 725/32 |
| 2016/0299505 A1* | 10/2016 | Ohara .................. B25J 11/0005 |
| 2016/0360267 A1* | 12/2016 | Marilly .............. H04N 21/4728 |
| 2017/0053304 A1 | 2/2017 | Eskilsson et al. |
| 2017/0085964 A1* | 3/2017 | Chen ............. H04N 21/234318 |
| 2017/0151484 A1 | 6/2017 | Reilly et al. |
| 2017/0200316 A1 | 7/2017 | Giordano et al. |
| 2017/0228875 A1 | 8/2017 | Nash et al. |
| 2017/0236162 A1 | 8/2017 | Christensen et al. |
| 2017/0286993 A1 | 10/2017 | Khalid et al. |
| 2017/0293942 A1* | 10/2017 | Coglitore ............... A61B 5/165 |
| 2017/0339415 A1 | 11/2017 | Wang et al. |
| 2017/0359603 A1 | 12/2017 | Levy |
| 2018/0004285 A1* | 1/2018 | Castleman ....... G11B 20/10527 |
| 2018/0045963 A1* | 2/2018 | Hoover .............. G02B 27/0172 |
| 2018/0056190 A1 | 3/2018 | Ahn et al. |
| 2018/0063599 A1 | 3/2018 | Park et al. |
| 2018/0190091 A1* | 7/2018 | Yuan ...................... H04N 7/181 |
| 2018/0211290 A1 | 7/2018 | Goldstein et al. |
| 2018/0247600 A1* | 8/2018 | Kang ................... G09G 3/3648 |
| 2018/0262684 A1 | 9/2018 | Lowry et al. |
| 2018/0276800 A1 | 9/2018 | Abbas et al. |
| 2018/0285924 A1 | 10/2018 | Carmichael |
| 2018/0286259 A1* | 10/2018 | Ni .......................... G09B 19/00 |
| 2018/0295400 A1 | 10/2018 | Thomas et al. |
| 2018/0302689 A1 | 10/2018 | Todorovic et al. |
| 2019/0253795 A1 | 8/2019 | Ozcan et al. |
| 2019/0287290 A1 | 9/2019 | Sakthivel et al. |
| 2020/0045363 A1* | 2/2020 | Nellore .............. H04N 21/4223 |
| 2020/0186875 A1 | 6/2020 | Han et al. |

OTHER PUBLICATIONS

Guo, Jinlian et al., "AdOn: an intelligent overlay video advertising system", Proceedings of the 32nd international ACM SIGIR conference on Research and development in information retrieval, ACM, Jan. 2009, pp. 1-3.

Han, Bo et al., Content-Aware Personalized Advertising for Online Video Streaming, AT&T Disclosure #2018-0209, U.S. Appl. No. 16/106,448, filed Aug. 21, 2018; pp. 1-63.

Helm, Chris, "Opening Up The Potential of 360 degrees Video for Advertising", AW 360, 360.advertisingweek.com, Dec. 11, 2017, pp. 1-6.

Huang, Yu, "Virtual ads insertion in street building views for augmented reality", Image Processing (ICIP), 2011 18th IEEE International Conference on. IEEE, Sep. 2011, pp. 1-5.

Kuzyakov, Evgeny et al., Under the hood: Building 360 video. https://code.facebook.com/posts/1638767863078802/under-the-hood-building-360-video/ ; Oct. 15, 2015; pp. 1-7.

Liu, Huiying et al., A Generic Virtual Content Insertion System Based on Visual Attention Analysis. Proceedings of ACM Multimedia 2008. pp. 1-11.

Ma, Yu-Fei et al., A Generic Framework of User Attention Model and Its Application in Video Summarization. IEEE Transactions on Multimedia, vol. 7, No. 5, pp. 907-919, 2005.

Morrison, Kimberlee , Internet Users Want a More Personalized Ad Experience. http://www.adweek.com/digital/internet-users-want-a-more-personalized-ad-experience-report/; May 18, 2016; pp. 1-11.

Pandolph, Stephanie , Personalized video ads are engaging consumers. http://www.businessinsider.com/personalized-video-ads-are-engaging-consumers; Nov. 24, 2017; pp. 1-3.

* cited by examiner

 
FIG. 2G

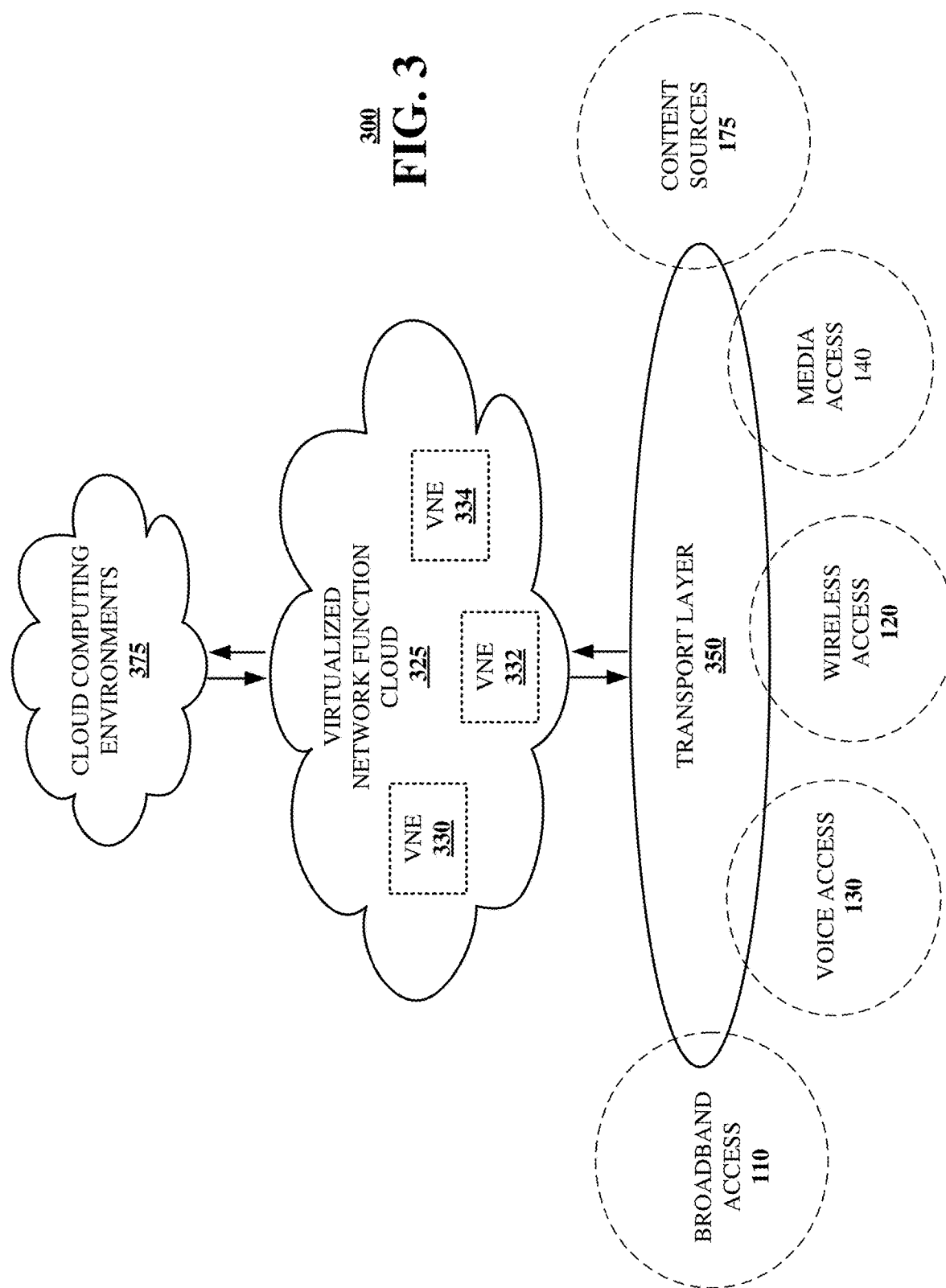

METHODS, DEVICES, AND SYSTEMS FOR EMBEDDING VISUAL ADVERTISEMENTS IN VIDEO CONTENT

CROSS REFERENCE TO RELATED APPLICATIONS

This application is a continuation of U.S. patent application Ser. No. 16/213,585 filed on Dec. 7, 2018. The contents of each of the foregoing is/are hereby incorporated by reference into this application as if set forth herein in full.

FIELD OF THE DISCLOSURE

The subject disclosure relates to methods, devices, and systems for embedding visual advertisement in video content.

BACKGROUND

The current state of the art streams panoramic video content from a video server to a communication device communicatively coupled to a virtual reality headset to view the panoramic video content. Visual advertisements are provided by periodically interrupting the panoramic video content stream with one or more visual advertisements. Once, the visual advertisements are presented, the panoramic video content stream is resumed.

BRIEF DESCRIPTION OF THE DRAWINGS

Reference will now be made to the accompanying drawings, which are not necessarily drawn to scale, and wherein:

FIGS. 2A-2C, 2E-2I are block diagrams illustrating examples, non-limiting embodiment of a system functioning within the communication network of FIG. 1 in accordance with various aspects described herein.

FIG. 3 is a block diagram illustrating an example, non-limiting embodiment of a virtualized communication network in accordance with various aspects described herein.

DETAILED DESCRIPTION

Figure 1:
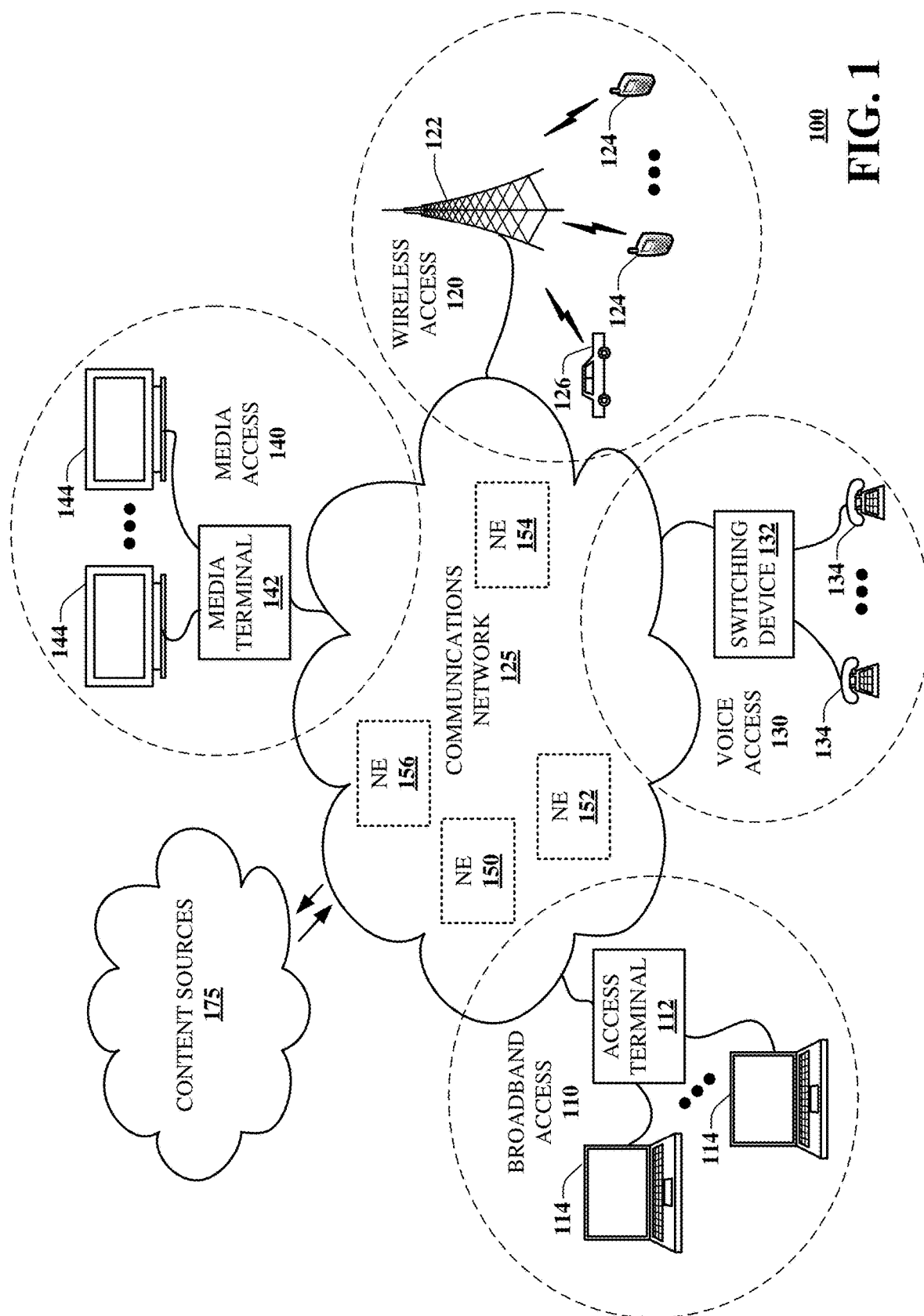
FIG. 1 is a block diagram illustrating an exemplary, non-limiting embodiment of a communications network in accordance with various aspects described herein.

The subject disclosure describes, among other things, illustrative embodiments that include obtaining video content. The video content can comprise a plurality of frames. Further embodiments include monitoring, by an image sensor, a facial feature of a user to determine a visual focus of the user in relation to the video content. Additional embodiments include detecting from a group of frames of the plurality of frames at least a reduction in movements of objects in the group of frames. Also, embodiments include determining, according to the monitoring and the detecting, a measure of attention of the user within a region of the group of frames. Further embodiments include determining that the measure of attention of the user within the region of the group of frames satisfies a threshold. Additional embodiments include embedding in at least a portion of subsequent frames of the plurality of frames a visual advertisement in the region for presentation to the user via a communication device receiving the at least the portion of subsequent frames of the plurality of frames. Other embodiments are described in the subject disclosure.

One or more aspects of the subject disclosure include a device, comprising a processing system including a processor, and a memory that stores executable instructions that, when executed by the processing system, facilitate performance of operations. The operations comprise obtaining video content, the video content comprises a plurality of frames. Further operations comprise monitoring, by an image sensor, a facial feature of a user to determine a visual focus of the user in relation to the video content. Additional operations comprise detecting from a group of frames of the plurality of frames at least a reduction in movements of objects in the group of frames. Also, operations comprise determining, according to the monitoring and the detecting, a measure of attention of the user within a region of the group of frames. Further operations comprise determining that the measure of attention of the user within the region of the group of frames satisfies a threshold. Additional operations comprise embedding in at least a portion of subsequent frames of the plurality of frames a visual advertisement in the region for presentation to the user via a communication device receiving the at least the portion of subsequent frames of the plurality of frames.

One or more aspects of the subject disclosure include a machine-readable medium, comprising executable instructions that, when executed by a processing system including a processor, facilitate performance of operations. The operations comprise obtaining video content, wherein the video content comprises a plurality of frames, monitoring, by a sensor, a feature of a user to determine a focus of attention of the user in relation to the video content, and detecting from a group of frames of the plurality of frames at least a reduction in movement of one or more objects in the group of frames. Further operations comprise detecting from sensor data supplied by the sensor a change in viewpoint of the user, and determining, according to the reduction in movement of the one or more objects and the change in viewpoint, a measure of attention of the user within a region of the group of frames according to the change in viewpoint. Additional operations comprise determining that the measure of attention of the user within the region of the group of frames satisfies a threshold, and inserting in at least a portion of subsequent frames of the plurality of frames a visual advertisement in the region for presentation to the user via a communication device receiving the at least the portion of subsequent frames of the plurality of frames.

One or more aspects of the subject disclosure include a method. The method comprises obtaining, by a processing system including a processor, video content, wherein the video content comprises a plurality of frames, monitoring, by the processing system via a sensor, a feature of a user to determine a focus of the user in relation to the video content, and identifying, by the processing system, a first visual advertisement embedded in a first group of frames of the plurality of frames. Further, the method comprises responsive to determining, by the processing system, that a time period since the first group of frames were presented by a communication device of the user exceeds a time threshold:

detecting, by the processing system, from a second group of frames of the plurality of frames at least a reduction in movement of one or more objects in the group of frames, the second group of frames occurs in time after the first group of frames, determining, by the processing system, according to sensor data supplied by the sensor and the reduction in movement of the one or more objects, a measure of attention of the user within a region of the group of frames, determining, by the processing system, that the measure of attention of the user within the region of the group of frames satisfies a threshold, and embedding, by the processing system, in at least a portion of frames of the plurality of frames that occur after the second group of frames a second visual advertisement in the region for presentation to the user via the communication device.

Referring now to FIG. 1, a block diagram is shown illustrating an example, non-limiting embodiment of a communications network 100 in accordance with various aspects described herein. For example, communications network 100 can facilitate in whole or in part embedding a visual advertisement in video content. In particular, a communications network 125 is presented for providing broadband access 110 to a plurality of data terminals 114 via access terminal 112, wireless access 120 to a plurality of mobile devices 12 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Figure 2A:
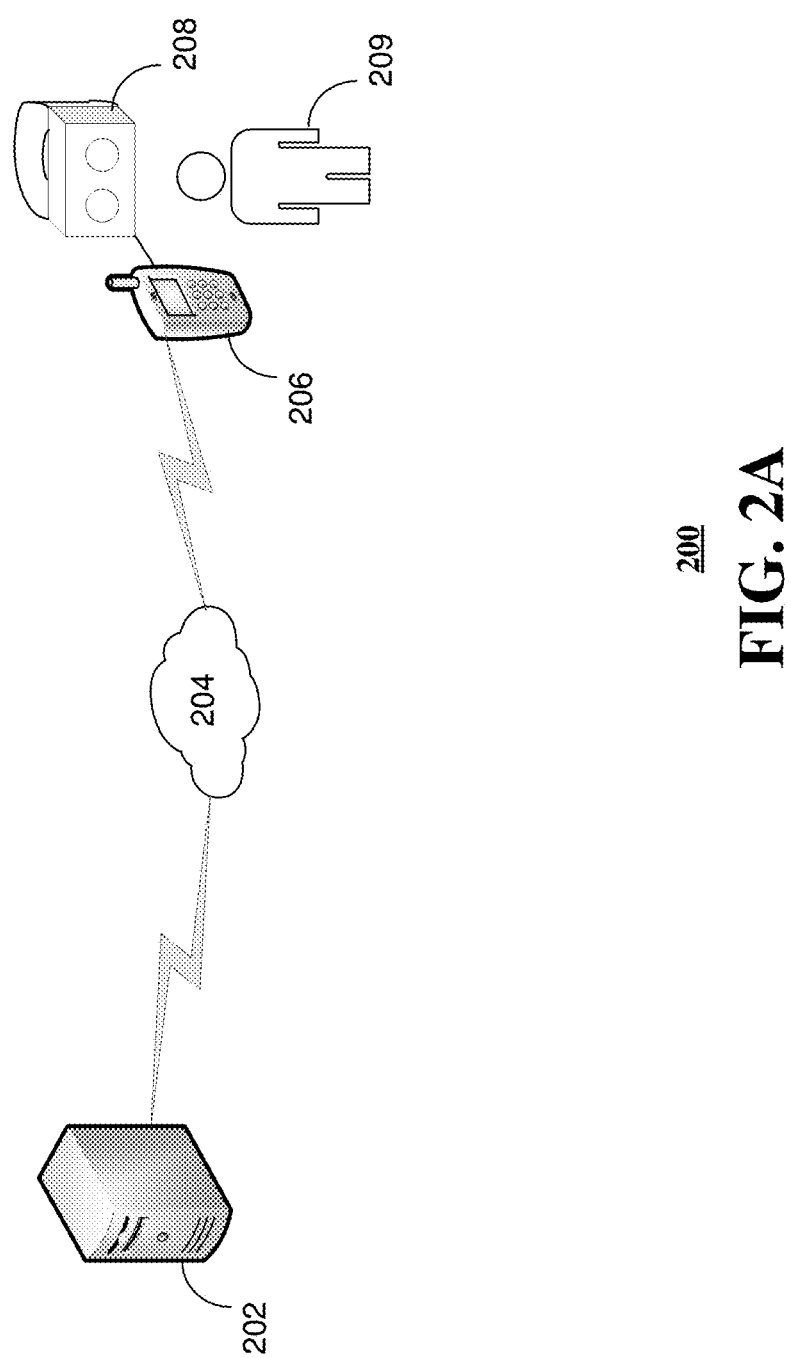
Figure 2B:
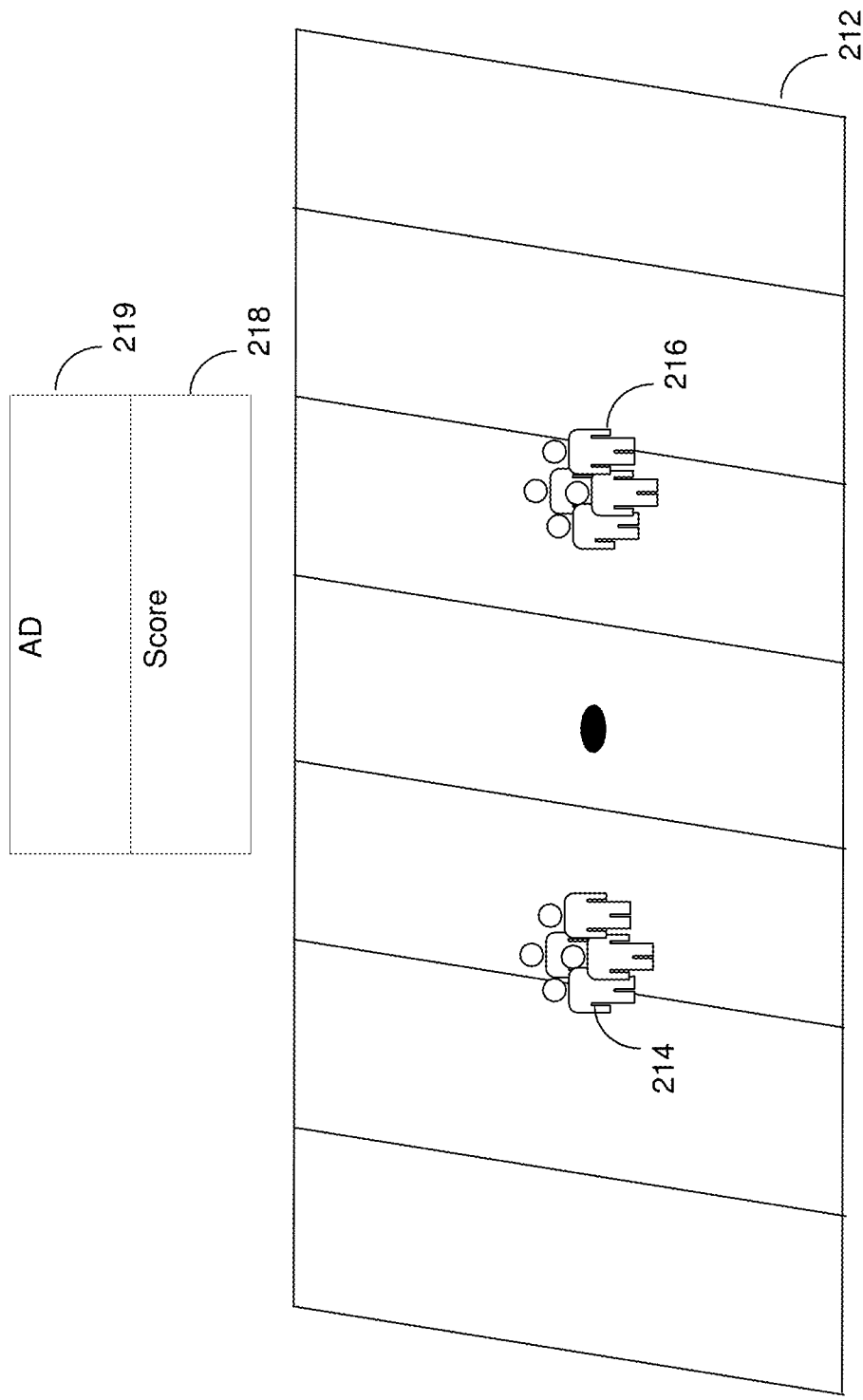
Figure 2C:
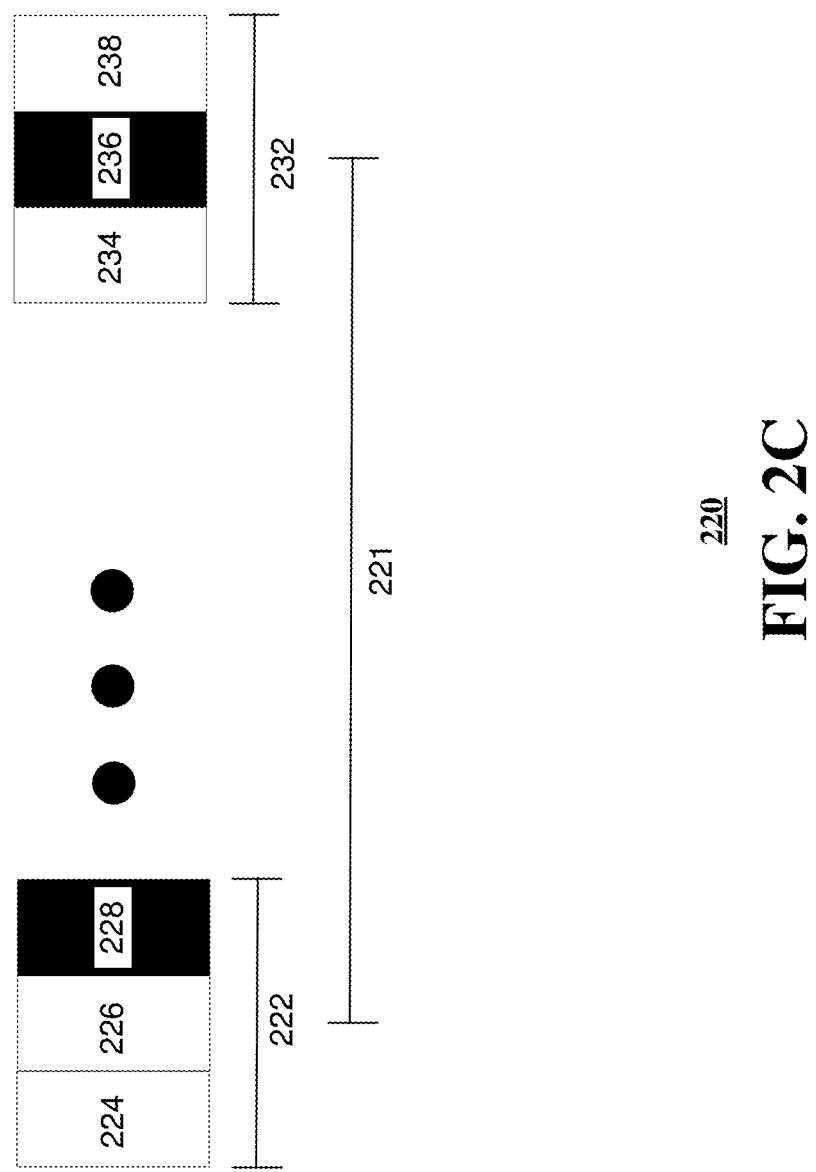

FIGS. 2A-2C are block diagrams illustrating examples, non-limiting embodiment of a system 200 functioning within the communication network of FIG. 1 in accordance with various aspects described herein. Referring to FIG. 2A, in one or more embodiments, the system 200 comprises a video content server 202 that can deliver video content to a client device 206 for a user 209 over a communication network 204. The client device 206 can include a mobile phone, tablet computer, laptop computer desktop computer, video game system, set top box, smart watch, wearable device, mobile device virtual reality headset, communication device, or any other computing device. In some embodiments, one or more client devices can be communicatively coupled to receive and display the video content deliver by the video content server 202. For example, a virtual reality headset 208 can be communicatively coupled to the client device 206 such that the client device 206 receives the video content and provides the video content to the virtual reality headset 208, which renders the video content on its display to be viewed by the user 209. In further embodiments, the video content can comprise panoramic video content. The panoramic video content can comprise 360 degree video content and/or less than 360 degree video content.

In one or more embodiments, the video content server 202 can embed a visual advertisement within an image of a frame of the video content prior to delivering the video content/frame with the embedded visual advertisement (video content comprises multiples frames and each frame includes an image). In some embodiments, the video content server 202 can obtain the video content. The video content can be obtained from a different video content server such as a video content server operated by a media content provider or obtained from a social media provider. In further embodiments, the video content server 202 can identify a previous time period in delivering the video content for embedding a previous visual advertisement and determining a difference from a current time period in delivering the video content and the previous time period. Further, the video content server 202 can determine that the difference exceeds a time threshold such that the video content prepares to embed a visual advertisement in a frame of the video content within the current time period. However, the video content analyzes each frame within the current time period to determine whether there is any content that may distract a user from viewing an embedded visual advertisement. For example, if the video content is a sports game, a video game, a musical concert, different frames of the video content can include a moving object such as a ball, opposing player, or singer, respectively. In some embodiments, the video content server 202 can detect that a current frame of the video content with the current time period does not include a moving object.

In one or more embodiments, the video content server 202 not only analyzes a current frame that does not include any distractions (e.g. a moving object) but also determines that a user has interest or is attentive to the image of the current frame to make it worthwhile to embed a visual advertisement that can be seen by a user. In some embodiments, the video content server 202 can determine that user attention exceeds a threshold for the current frame in response to performing user attention analysis on the current frame (or the image of the current frame). The user attention analysis can include visual attention analysis. (Although some embodiments describe such analysis is performed by the video content server 202, in other embodiments such analysis (determining user, etc.) can be performed by client device 206 and the results of such analysis are then related to the server). For example, the video content can include a football game. Visual attention analysis can determine that the current frame shows an image of the teams huddling with each other before start of a play. Visual attention can be high for such an image of a current frame but does not include a distraction such as a moving football. Further, the user attention analysis can include audio attention analysis. Returning to the example that the video content can include a football game, audio attention analysis can determine that the current frame shows an image of the teams huddling with each other before start of a play such that ambient noise level is low and not a distraction.

In one or more embodiments, the video content server 202 can identify a low user attention region within the image of the current frame according to the user attention analysis. In some embodiments, the video content server 202 can detect a change in viewpoint of the user viewing the video content. For example, the client device 206 can provide the change in viewpoint to the video content server 202 in a message sent over the communication network 204. Further, the video content server 202 can identify the low user attention region according to the change in viewpoint. For example, during presenting a previous frame of teams huddling prior to a play in video content of a football game, the video content detects that the user adjusted her/his view to a scoreboard presented in the video content. The video content server 202 can perform spatial analysis of the current frame of the two football teams huddling together prior to another play and determine that the area above the scoreboard is a low user attention region and embed the visual advertisement in such a low user attention region using user attention analysis described herein.

In additional embodiments, the video content server 202 can embed a visual advertisement in the low attention region within the image of the current frame. In other embodiments, the video content server 202 can provide or deliver multiple frames of the video content including the current frame to the client device 206. Further, the client device 206 can present the multiple frames of the video content including the current, which includes the embedded visual advertisement.

In one or more embodiments, the video content server 202 can obtain video content such that the video content comprises a plurality of frames. Further, the video content can be monitoring by an image sensor a facial feature of a user to determine a visual focus of the user in relation to the video content. In addition, the video content server 202 can detect from a group of frames of the plurality of frames at least in a reduction in movements of objects in the group of frames. Also, the video content server 202 can determine, according to the monitoring and the detecting, a measure of attention of the user within a region of the group of frames. Further, the video content server 202 can determine that the measure of attention of the user within the region of the group of frames satisfies a threshold. In addition, the video content server 202 can embed in at least a portion of subsequent frames of the plurality of frames a visual advertisement in the region for presentation to the user via a communication device. Also, the video content server 202 can provide or deliver the portion of the subsequent frames including the embedded visual advertisement to the client device 206 over the communication network 204 to be rendered on the display of the virtual reality headset 208 to be viewed by user 209.

In one or more embodiments, the threshold can comprise the measure of attention and a measure of movement of an object. In further embodiments, the region of the group of frames satisfying the threshold comprises a low user attention region. In additional embodiments, the facial feature of the user comprises at least one eye of the user, and the monitoring comprises monitoring, by the image sensor, a pupil of the at least one eye of the user. In some embodiments, the image sensor can be a camera sensor. In other embodiments, the determining of the measure of attention can comprise the video content server 202 performing user attention analysis on the group of frames. The performing of the user attention analysis can comprise one of the video content server 202 performing video user attention analysis or the video content server 202 performing audio user attention analysis.

In one or more embodiments, the video content server can comprise identifying a current time period to embed the visual advertisement. The group of frames and the portion of subsequent frames are within the current time period. Further, the identifying of the current time period can comprise identifying a previous time period for embedding a previous visual advertisement, and determining a difference from the current time period and the previous time period exceeds a time threshold.

In one or more embodiments, the video content server 202 can comprise detecting a change in viewpoint of the user. The determining of the measure of attention of the user within the region of the group of frames can comprise determining the measure of attention of the user within the region of the group of frames according to the change in viewpoint. In further embodiments the determining of the measure of attention of the user within the region of the group of frames can comprise the video content server identifying region of the group of frames in response to the video content server 202 performing a spatial analysis on the group of frames.

Referring to FIG. 2B, in one or more embodiments, the system 210 illustrates an image of a current frame 210 of a football game. The current frame 210 shows a football field 212 on which two football teams 214, 216 huddling together prior to a play. A video content server (as shown in FIG. 2A) can detect that there is no distraction in the current frame 210 such as a moving object (e.g. football). However, user attention analysis determines that user attention for such a current frame 210 exceeds a threshold. For example, analysis of other, similar frames from other video content (based on historical data for the current user or other users) or within the same video content (based on historical data for the current user or other users) can show that users pay attention to such a frame (or group of frames) for a majority of time the frame is displayed. That is, client devices can track viewership on whether users change video content or not during the display of such frames or can capture images of users viewing the frame and detect the viewer is facing the display presenting the frame rather looking away using image recognition techniques. Further user attention analysis can be detecting (by the video content server) user interaction of other client devices (such as social media) or interacting of other applications (such as social media) on the same client device. For example, the client device can detect that a user interacts with social media during the presentation of such a frame. Such an interaction can show that the user has a low attention for the current video content presented on the client device. However, if the user is determined to pay attention for a period of time that exceeds a threshold (e.g. threshold can be the majority of time the current frame (or group of frames) or other similar frames is/are presented), then the video content server can embed visual advertisement in the frame (or group of frames).

In one or more embodiments, the video content server can identify a low user attention region within the current frame to embed the visual advertisement. In the current frame 210, the video content server can detect that the scoreboard 218 is a high attention region for the user but a region above the scoreboard 219 is a low attention region using the same or similar techniques as user attention analysis described herein. Thus, video content server can embed the visual advertisement in the low attention region 219 and deliver the video content with the current frame having the low attention region to the client device for presentation to the user.

Referring to FIG. 2C, in one or more embodiments, a system 220 shows previous frames 224, 226, 228 in a previous time period 222 in which a previous visual advertisement was embedded in previous frame 228. Previous frame 228 may have been selected by a video content server (as shown in FIG. 2A) as opposed to previous frames 224, 226 because the video content server detected a user distraction such as a moving object in previous frames 224, 226. Further, the video content server determines the time period 221 between the previous time period 222 and the current time period 232 exceeds a threshold. In addition, the video content server analyzes the current frames 234, 236, 238 to determine whether there is a user distraction such as a moving object contained therein. The video content server can determine that current frame 236 does not include a user distraction such as a moving object and selects current frame 236 to embed a visual advertisement.

In one or more embodiments, a person of ordinary skill in the art would understand that visual advertisements take up more than one frame and that although drawings may show one frame this is just for illustration purposes. In further embodiments, a visual advertisement would be embedded in several frames. For example, a ten second visual advertisement embedded in video content presented at 32 frames per second would embed the visual advertisement in 320 frames. Thus, a person of ordinary skill in the art would understand that when discussing one frame in any embodiment described herein, a group of frames can also be described for each embodiments.

Figure 2D:
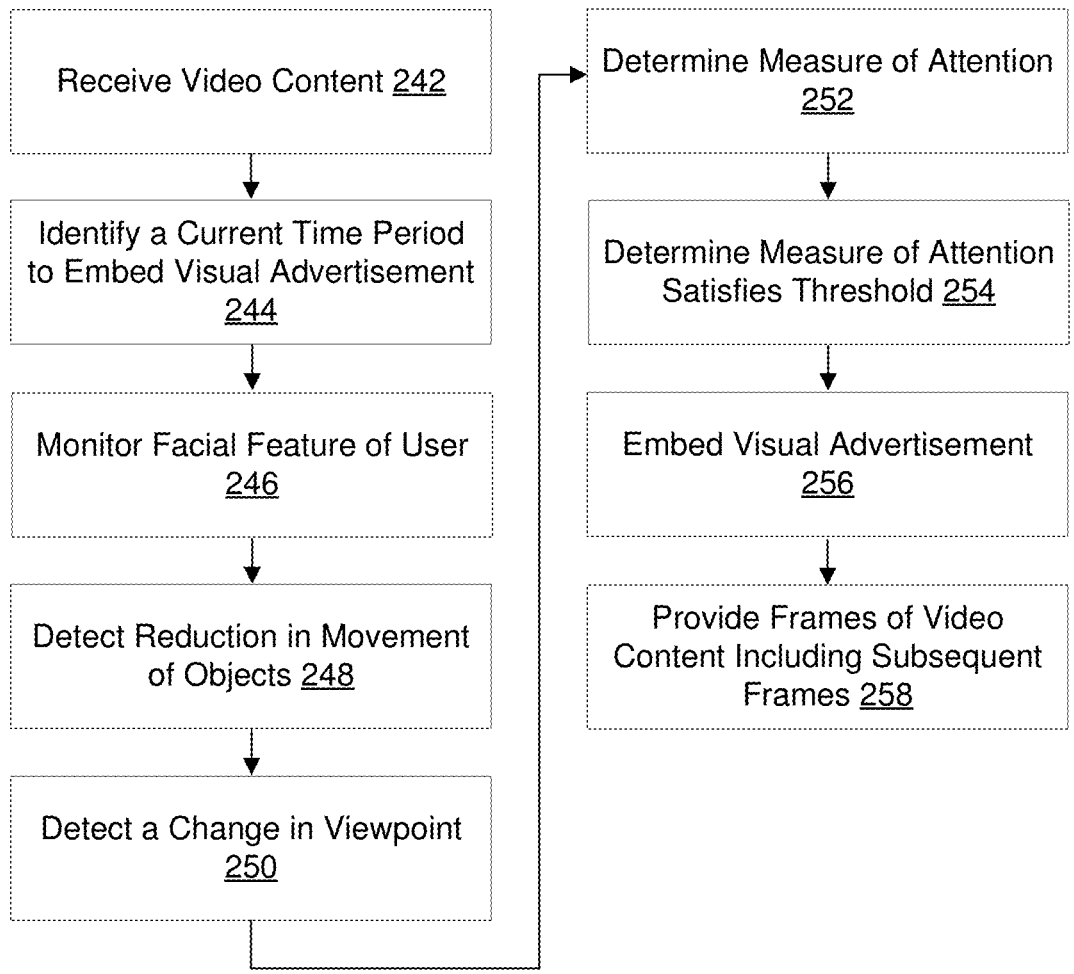
FIG. 2D depicts an illustrative embodiment of a method in accordance with various aspects described herein.

FIG. 2D depicts an illustrative embodiment of a method 240 in accordance with various aspects described herein. In one or more embodiments, the method 240 can be implemented by a server as shown in FIG. 2A. The method 240 can include the server, at 242, receiving or obtaining video content, the video content comprises a plurality of frames. Further, method 240 can include the server, at 244, identifying a current time period to embed the visual advertisement. In additional embodiments, the identifying of the current time period comprises identifying a previous time period for embedding a previous visual advertisement, and determining a difference from the current time period and the previous time period exceeds a time threshold. The group of frames and the portion of the subsequent frames described herein can be within the current time period. In addition, method 240 can include the server, at 246, monitoring, by an image sensor, a facial feature of a user to determine a visual focus of the user in relation to the video content. The facial feature of the user comprises at least one eye of the user, and the monitoring comprises monitoring, by the image sensor, a pupil of the at least one eye of the user. The image sensor comprises a camera sensor.

Also, method 240 can include the server, at 248, detecting from a group of frames of the plurality of frames at least in a reduction in movements of objects in the group of frames. Further, the method 240 can include the server, at 250, detecting a change in viewpoint of the user. In addition, the method 240 can include the server, at 252, determining, according to the monitoring and the detecting, a measure of attention of the user within a region of the group of frames. In some embodiments, the determining the measure of attention of the user within the region of the group of frames comprises determining the measure of attention of the user within the region of the group of frames according to the change in viewpoint. Also, the method 240 can include the server, at 254, determining that the measure of attention of the user within the region of the group of frames satisfies a threshold. The threshold comprises a desired measure of attention of the user and a measure of movement of the object(s). The region in the group of frames satisfying the threshold comprises a low user attention region. The determining of the measure of attention of the user comprises performing user attention analysis on the group of frames. The performing of the user attention analysis comprises performing video user attention analysis or performing audio user attention analysis. The determining the measure of attention of the user within the region of the group of frames in response to performing a spatial analysis on the group of frames.

Further, the method 240 can include the server, at 256, embedding in at least a portion of subsequent frames of the plurality of frames a visual advertisement in the region for presentation to the user via a communication device. In addition, the method 240 can include the server, at 258, providing the portion of subsequent frames of the video content to a communication device. In some embodiments, the communication device presents the portion of subsequent frames of the video content, the portion of subsequent frames includes the visual advertisement. The video content can comprise panoramic video content. In further embodiments, the panoramic video content can include 360 degree video content or less than 360 video degree video content.

In some embodiments, the communication device can comprise a virtual reality headset.

While for purposes of simplicity of explanation, the respective processes are shown and described as a series of blocks in FIG. 2D, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

In addition, a portion of one or more embodiments described herein can be combined with a portion of one or more other embodiments.

In one or more embodiments, the predominance of video streaming in today's Internet shows no sign of weakening. In Q4 2016, mobile videos eventually surpassed desktop videos in terms of online viewing time. Today's mobile videos are escalating in many dimensions including resolution, frame rate, codec, and in particular, the interaction method (e.g., 360-degree video and drone-assisted video). Such changes are fueled by multiple factors including faster mobile networks (LTE and 5G), new video types, more powerful devices, and affordable gears such as Virtual Reality (VR) headsets.

One or more embodiments, determine when, where and how to embed visual advertisement content for panoramic 360-degree video streaming. 360-degree videos, also known as immersive videos, are expected to become "the next frontier in mobile video". As a component of VR, they provide users with an immersive viewing experience that far exceeds what regular videos can offer. They are becoming increasingly popular on commercial platforms, such as YouTube and Facebook, with the top videos being viewed more than 60 million times. Note embodiments described herein are not limited to mobile 360-degree video. It applies equally to 360-degree video on a large screen TV as long as the user has a means of changing the viewport or viewpoint.

Figure 2E:
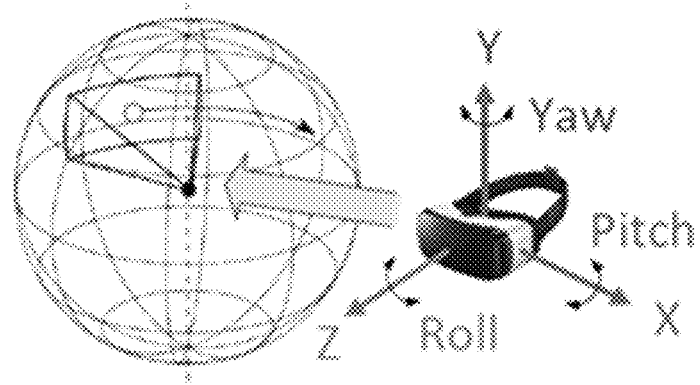

360-degree videos are recorded using omnidirectional cameras or camera array systems (e.g., Facebook Surround 360), and then "wrapped" onto a 3D sphere, with the cameras at its center. When watching a 360-degree video, a viewer at the spherical center can freely control her/his viewing direction, so each playback creates a unique experience. The control of viewing directions is achieved through head movement when using head-mounted devices, hand movement for phones and tablets, remote controls for large screen TVs, and mouse click for laptops and desktops. As shown in FIG. 2E, when watching a monoscopic 360-degree video a user wearing a VR headset can adjust her/his orientation by changing the pitch, yaw, and roll, which correspond to rotating along the X, Y, and Z axes, respectively. 360-degree video players compute and display the viewing area based on the orientation and the field of view (FoV). FoV defines the extent of the observable area, which is usually a fixed parameter of a VR headset (e.g., 110° horizontally and 90° vertically).

Figure 2F:
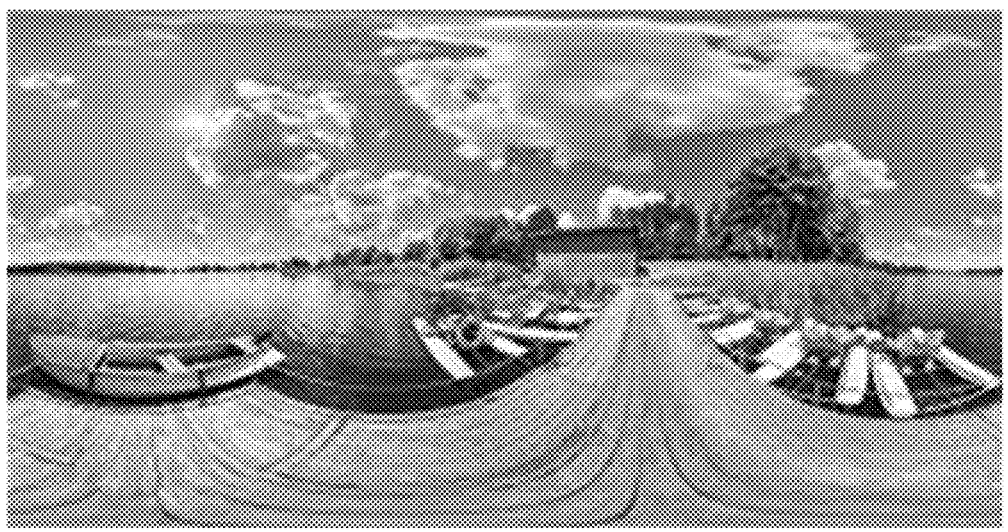

In one or more embodiments, there are several projection schemes for 360-degree videos. A projection is a transformation of the locations from the surface of a sphere into locations on a plane. The two most popular projections are equirectangular and cube map. Equirectangular is a very simple map projection, as shown in FIG. 2F. Cube map projects a 360-degree view to the six faces of a cube. Equirectangular is widely used by YouTube and most Facebook 360-degree videos use cube map projection.

In one or more embodiments, in terms of 360-degree video streaming, a solution, which is also widely used by most content providers, delivers the panoramic views. This scheme is not network friendly, as viewers can watch only a small part of the delivered video. For more advanced schemes that perform viewport adaptation, the schemes can be divided into two categories, tile based and version based. For the tiling scheme, it spatially segments a 360-degree video into tiles. It then delivers only tiles within FoVs. To increase the robustness of video streaming, it can also fetch the rest at lower qualities. For the versioning solution, a 360-degree video is encoded into multiple versions each having a different high-quality region. A video player picks the right version based on user's viewing direction. One practical issue of this scheme is that it incurs significant overhead at the server side.

One or more embodiments can be applied to any projection scheme and does not depend on the underlying streaming mechanism. One or more embodiments can be used for any type of devices, including head-mounted devices, smartphones, tablets, laptops, desktops, smart TV, etc. Further embodiments can be used in conjunction with stereoscopic 360-degree videos, for which users can change their view directions in a 6DoF (six Degrees of Freedom) system (i.e., up/down, left/right, and front/back).

In one or more embodiments, there are two types of advertisement insertion methods for video streaming. Some embodiments can insert a video advertisement segment (i.e., an independent video clip) directly into the video streaming. For example, the insertion time can be selected when the regular content discontinuity is high and the attractiveness is low, in order to make the insertion not intrusive (avoiding interruption of user's viewing experience). When it is time to play the advertisement video, the regular video streaming will be paused. After the playback of the advertisement video, the video player can resume the original video streaming. Another approach of advertisement insertion is to embed visual advertisement content into each video frame. Similar as the first method, one question to answer is when to embed the visual advertisement content. Another problem is where to insert the visual advertisement content, as shown in FIG. 2G. One key issue of the first type of advertisement insertion is that it is still intrusive and interruptive and may significantly affect the quality of user experience, compared with the second approach.

The goal of visual advertisement content embedding is to make the insertion more noticeable by the audience to make it effective and at the same time not to interrupt the viewing experience of the original video streaming. To achieve a balance between these two objectives, the virtual content can be inserted when the original video attracts more attention from the audience and in the area which contains less valuable information. For example, by leveraging attention analysis, embodiments can identify Higher Attentive Shot (HAS) as the insertion time and Lower Attention Region (LAR) as the insertion location. Embodiments can also conduct both spatial and temporal attention analysis.

User attention analysis has been extensively investigated by the research community for more than a decade. Traditional computational attention analysis methods can be based on saliency, contrast and information theory, etc. These static attention analysis solutions have also been extended to the spatial-temporal domain for detecting Lower Attention Region, for example, by considering motion saliency. Regarding temporal attention analysis, usually frames that are significantly different from the preceding ones attract more attention from the audience, which is used for the detection of Higher Attentive Shot.

In some embodiments, "Attention is a neurobiological conception. It means the concentration of mental powers upon an object by close or careful observing or listening, which is the ability or power to concentrate mentally. Also, it is a condition of readiness for such attention involving especially a selective narrowing or focusing of consciousness and receptivity." In order to model user attention, embodiments can present a generic framework that estimates the attention users may pay to video content when watching video streaming. In particular, a viewer's attention can be defined through multiple sensory perceptions including visual and aural stimulus and partly semantic understanding, and include several modeling methods for visual and aural attentions. These can include four visual attention models and three aural attention models. The visual attention models include a motion attention model, a static attention model, a face attention model and a camera motion model. The three aural attention models are aural saliency model and speech and music attention models.

Besides the question of when and where to embed visual advertisement content, embodiments can also aim to offer personalized advertisement embedding for panoramic video streaming, with the goal to help advertisers effectively and efficiently reach their customers. Embodiments can include enabling personalized and content-aware advertising, which is simple and is based on the analysis of what type of content in a panoramic video a specific viewer may be interested in.

One or more embodiments can show that personalized video advertisements are engaging consumers by offering information and products that are relevant to them and users actually want a more personalized advertising experience. The scope of the embodiments is to investigate how to leverage content analysis to facilitate personalized advertising for online videos. Although similar concepts have been utilized before, existing solutions are usually based on coarse-granularity video content analysis. For example, two different persons watching the same set of videos can probably get the same targeted advertisement, as the analysis is done solely based on the genre of the consumed video. However, even for the same video, different persons may be interested in different portions of it. This fact is ignored by existing solutions. What is more important is that, given the popularity of the emerging 360-degree videos, the consumed content of two viewers may be significantly different from each other, as they can freely select the content they are going to watch by changing the viewing direction. Embodiments can include fine-granularity content analysis that can help advertisers better serve consumers of online videos by offering more relevant advertisements. This type of fine granularity content analysis is what embodiments can leverage.

Further one or more embodiments can aim to address the problem on when, where and how to embed visual advertisement content for panoramic video streaming using a holistic solution.

One or more embodiments can focus on personalized visual advertisement content embedding for panoramic video streaming. In general, there are three types of participants in the advertising ecosystems: advertisers who want to promote their brand and products and can pay for the advertisements, users who can consume the advertisements, and ad service providers who determine what advertisement to display to users, e.g., based on their preferences and/or interests. Advertisers make payments to advertisement service providers, for example, for clicks on their online advertisements displayed on websites. The goal of an advertiser is to make their ads reach the appropriate users who wish to get ads relevant to them. In terms of ad service providers, they want to improve the efficiency, scalability and robustness of their system and maximize their revenue. The effectiveness of an advertising system can be measured by the so-called Click Through Rate (CTR) for web-based systems and brand perception for video based systems.

Embodiments can describe what visual advertisement content should be selected and delivered to customers. Periodically a video player fetches video chunks from a content server, which could be either the original video server, or a CDN (Content Delivery Network) server. The player collects the view directions from users to identify the Region of Interests (RoIs). If there is any RoI identified for the frame that the user is currently consuming, the player will report the RoI related information to the advertisement service provider. The information includes the timestamp of the current video frame, the central point of the current RoI, and the size of Field of View (FoV). Note that this information is reported to the advertisement service provider for every video frame. Given the small amount of collected data, the communication overhead should not be high. Embodiments can further compress the data by sending a report only when the delta from the last report is significant enough (e.g., higher than a pre-defined threshold).

The advertisement service provider utilizes the information collected from users to determine the most relevant visual advertisement content for a specific user. There are two key components in the selection pipeline. The first one is to retrieve the keywords from the detected RoIs, in order to leverage existing work on textual information based target advertising used for webpages. The input to this component is the video content in the reported RoI for a given user. After that, embodiments can use either object classification algorithms or automatic description generation for images to create the keywords for the corresponding video content, and update the profile for that user. The second key component is the advertisement selection algorithm, which chooses the most relevant video advertisement according to the profile from that user. There are several approaches for the advertisement selection algorithm. For example, embodiments can generate a set of keywords from candidate video advertisements, compute the vector distance between the keyword set of each candidate and that from a user's profile, and choose the video advertisement that leads to the shortest distance.

Figure 2H:
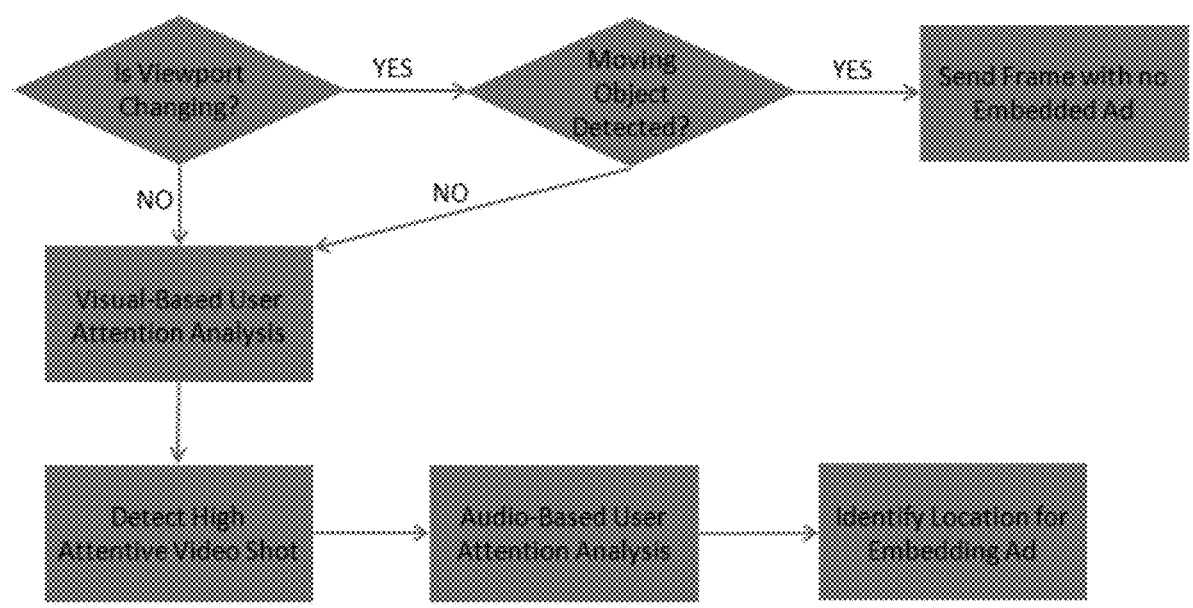

Embodiments can describe the workflow, as shown in FIG. 2H, for determining the insertion time for visual advertisement content. Note that in some embodiments have this workflow running on the video server side. (In other embodiments, such a workflow can be run on client devices including but not limited to 4K televisions). The client player can periodically send the current viewport information to the server. If the viewport is not changing, the server can execute the visual-based user attention analysis algorithm. Otherwise, the server can detect whether there are moving objects in the current viewport and the viewer is actively following these objects. If this is the case, the server can send regular video frames without embedded visual advertisement content to the client, as it may be intrusive when the user is actually focusing on the regular video streaming content. On the other hand, if there is no moving object of interest detected in the current viewport, the server can execute the same user attention analysis algorithm, because the user now may be actively looking for interesting objects/scenes. Note that if the viewport is changing in the opposite direction of the moving object, then embodiments can still embed visual advertisement content because the user is not focusing on the moving object. More generally, if the speed and/or direction of the change in viewport is significantly different than the speed/direction of the moving object, then the user is not focusing on that moving object and it is possible to embed visual content. For sports games, when the game is stopped (e.g., in soccer because of players pretending to be injured) it is a good opportunity to insert visual content regardless of whether the viewport is changing or not. Embodiments can also analyze the audio track for when to embed the visual advertisement content. If there is a heavy dialog, or if the background music is building up in a scene full of suspense, then it is best not to intrude. On the other hand, scenes with silence or low-level background noise might be better for visual advertisement content insertion. The output of the above user attention analysis algorithms, both visual-based and audio-based, can be the proper time instances when the server can potentially insert visual advertisement content determined in the first step, depending on whether a proper location can be identified next.

Figure 2I:
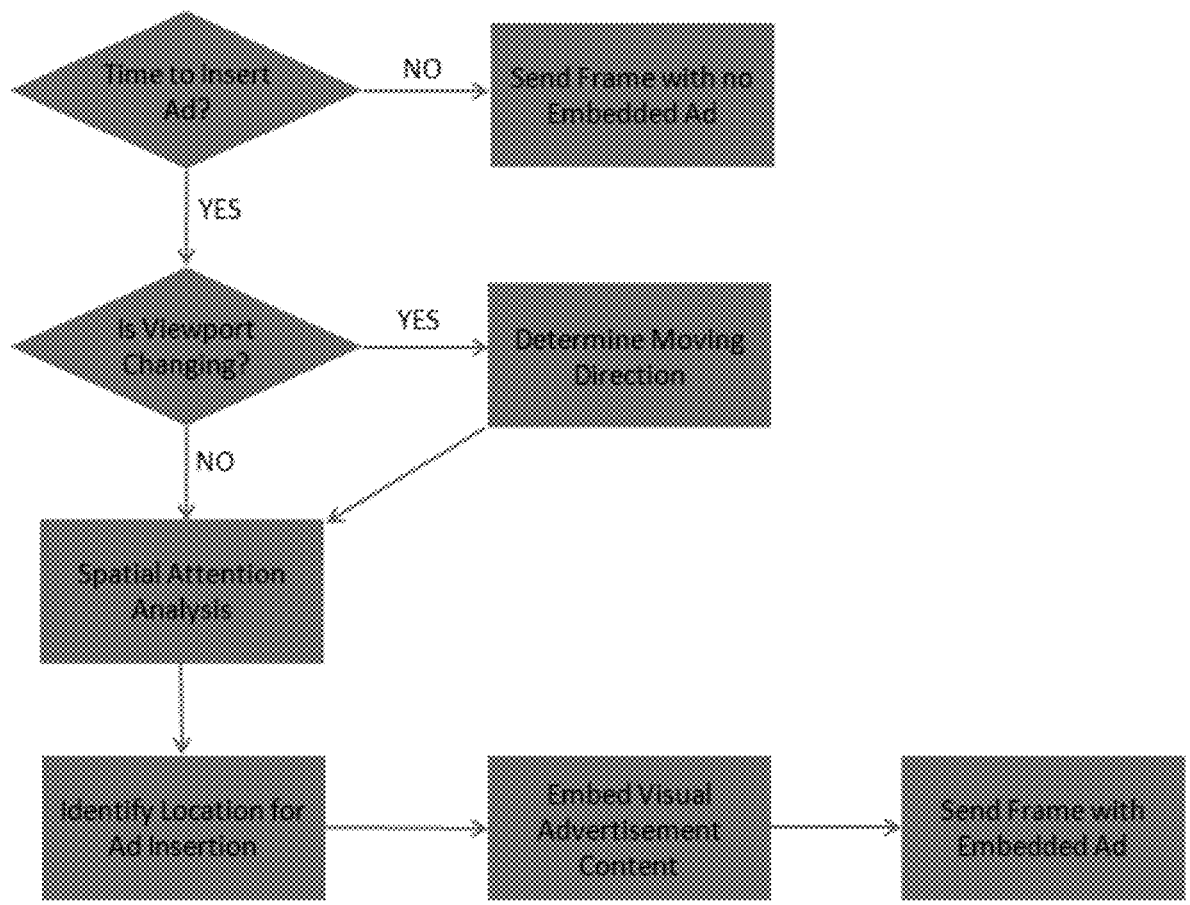

Embodiments can include a workflow, as shown in FIG. 2I, for determining the location for visual advertisement content embedding. Note that in some embodiments have this workflow running on the video server side. (In other embodiments, such a workflow can be run on client devices including but not limited to 4K televisions). When it is time to embed visual advertisement content, the server can first check whether the viewport is changing. If not, it can execute the spatial attention analysis algorithm to determine several candidate areas. If the viewport is actually changing, the server can determine the moving direction based on the viewport trajectory reported by the client. When identifying the location for visual advertisement content embedding, the area with less information has a higher priority for static viewports, with the goal to make the insertion not intrusive. When the viewport is changing, the area that the viewer is moving toward has a higher priority, in order to keep the embedded visual advertisement content in the viewport as long as possible and thus make the advertising more effective. For example, when a user is moving her viewing direction to the left, the area on the left hand side of the viewport would have a higher priority of being selected for visual advertisement content embedding. Once the insertion location is determined, the video server can embed the visual advertisement content selected in the first step into each video frame and deliver it to the client.

The above description is for the delivery of visual advertisement content. Embodiments can also be extended to support other types of advertisements, such as display ads, social media ads, email ads, search engine marketing, etc. The embedded visual advertisement content is usually clickable. After users click on it, it can either play the embedded video clip or re-direct them to proper locations (e.g., a website). In order to make the proposed system privacy aware, embodiments can leverage existing solutions, for example, by using a server-proxy architecture, where the server is responsible for advertisement selection algorithms, determines the final delivered video ads, and identifies the insertion time and location for visual advertisement content, whereas the proxy takes care of the aggregation and anonymization of privacy related information.

Referring now to FIG. 3, a block diagram 300 is shown illustrating an example, non-limiting embodiment of a virtualized communication network in accordance with various aspects described herein. In particular a virtualized communication network is presented that can be used to implement some or all of the subsystems and functions of communication network 100, the subsystems and functions of system 200, and method 240 presented in FIGS. 1, 2A, 2B, 2C, 2D and 3. For example, virtualized communication network 300 can facilitate in whole or in part embedding a visual advertisement in video content.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general purpose processors or general purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it's elastic: so the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized, and might require special DSP code and analog front-ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements don't typically need to forward large amounts of traffic, their workload can be distributed across a number of servers—each of which adds a portion of the capability, and overall which creates an elastic function with higher availability than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud, or might simply orchestrate workloads supported entirely in NFV infrastructure from these third party locations.

Figure 4:
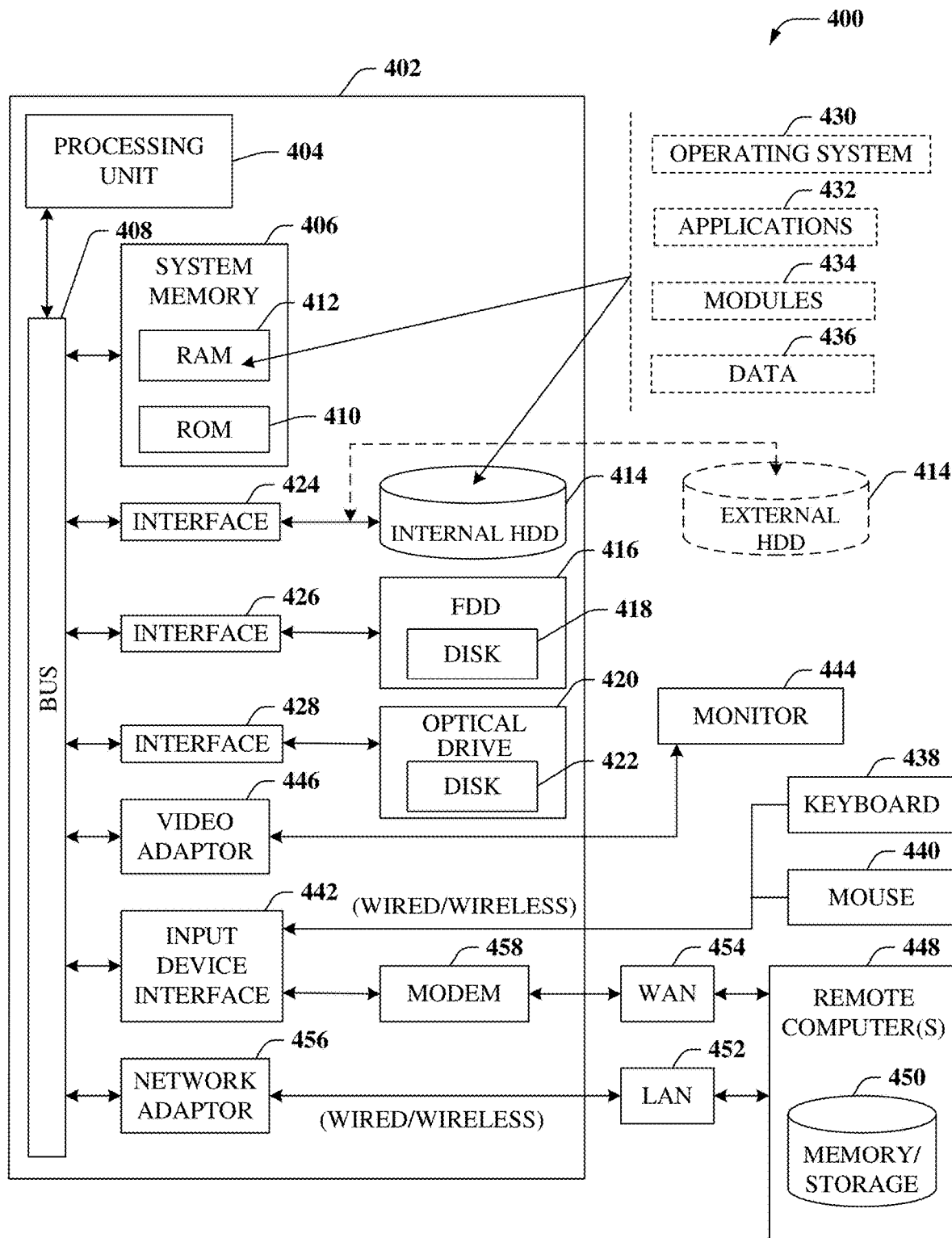
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part embedding a visual advertisement in video content. Further, the video content server 202, client device 206, and virtual reality headset 208 can comprise the computing environment 400.

Generally, program modules comprise routines, programs, components, data structures, etc., that perform particular tasks or implement particular abstract data types. Moreover, those skilled in the art will appreciate that the inventive methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
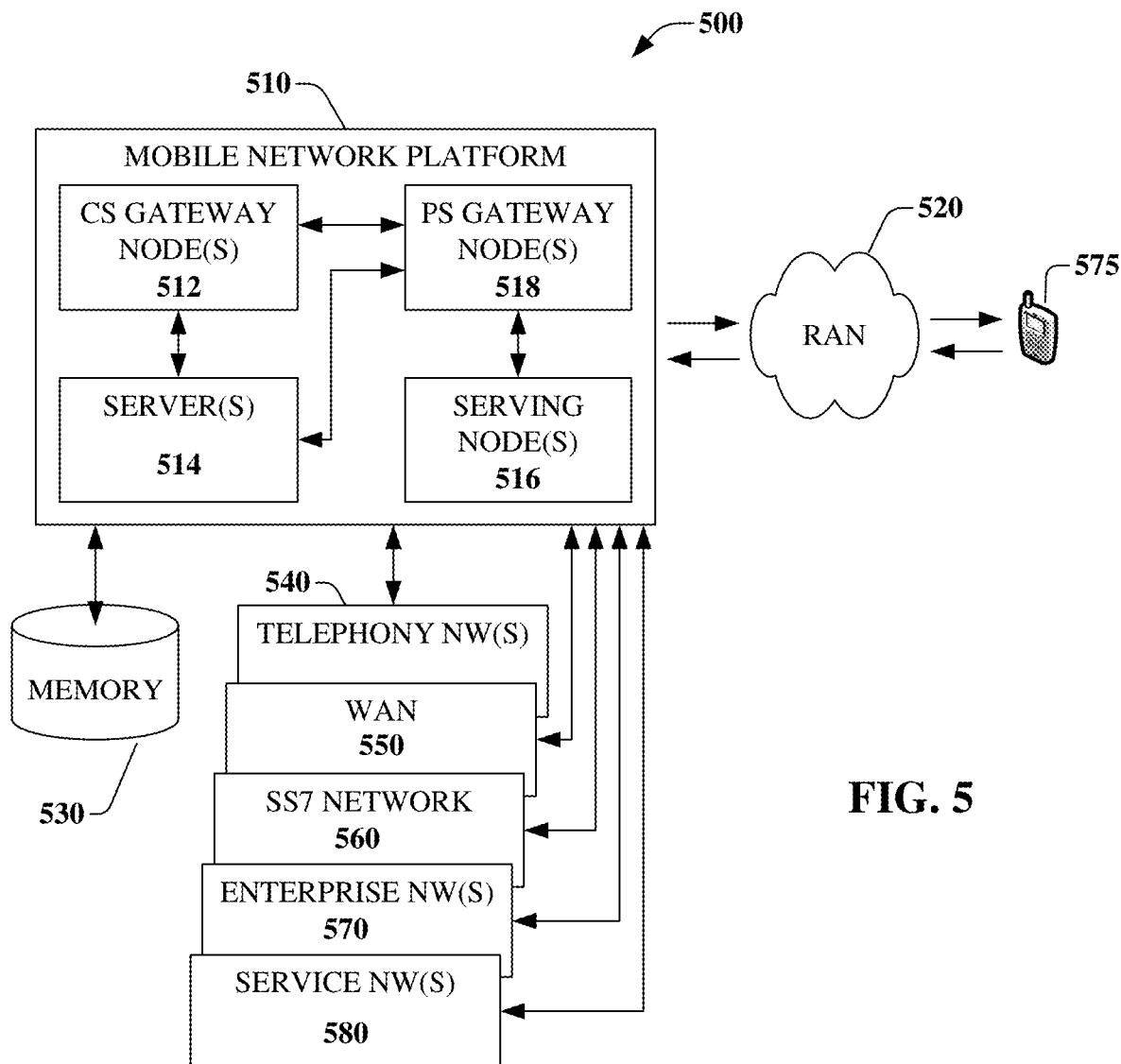
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate in whole or in part embedding a visual advertisement in video content. In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks, and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology(ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(s) that enhance wireless service coverage by providing more network coverage.

It is to be noted that server(s) 514 can comprise one or more processors configured to confer at least in part the functionality of mobile network platform 510. To that end, the one or more processor can execute code instructions stored in memory 530, for example. It is should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
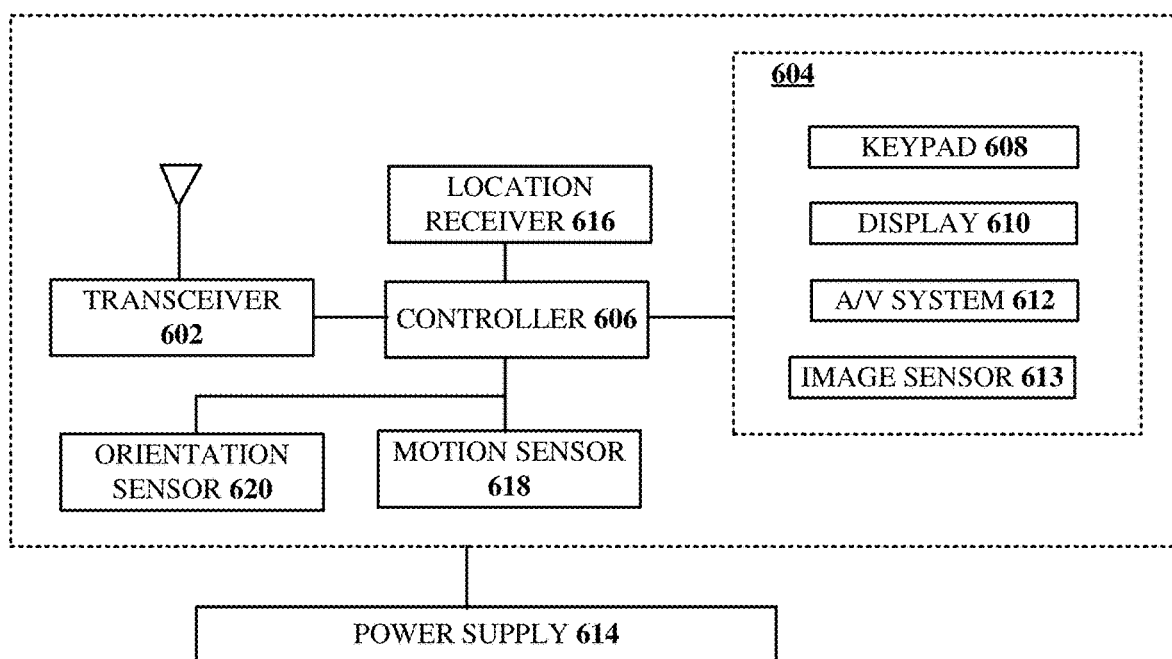
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, computing device 600 can facilitate in whole or in part embedding a visual advertisement in video content. Further, the video content server 202, client device 206, and virtual reality headset 208 can comprise the computing device 600.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1×, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, nonvolatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, $x=(x1, x2, x3, x4, \ldots, xn)$, to a confidence that the input belongs to a class, that is, $f(x)$ =confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A device, comprising:
a processing system including a processor; and
a memory that stores executable instructions that, when executed by the processing system, facilitate performance of operations, the operations comprising:
obtaining video content that comprises a plurality of frames;
determining a viewpoint trajectory in response to detecting a change in viewpoint by a user in viewing the video content;
performing a first determination that a first region of a first frame of the plurality of frames comprises a determined high user attention region;
during a presentation of the first frame, performing a second determination that the viewpoint has been adjusted to a second region of the first frame that comprises a determined low user attention region;
identifying a particular portion of subsequent frames of the plurality of frames to insert a visual advertisement according to the viewpoint trajectory, according to the first determination, and also according to the second determination, wherein the particular portion of the subsequent frames corresponds to the second region of the first frame, and wherein a different portion of the subsequent frames corresponds to the first region of the first frame; and
embedding the visual advertisement in the particular portion of the subsequent frames such that the visual advertisement is embedded in a determined low user attention region and not in a determined high user attention region, wherein the subsequent frames, including the different portion and the visual advertisement in the particular portion, are presented on a communication device associated with the user.

2. The device of claim 1, wherein the operations comprise monitoring, by an image sensor, a facial feature of the user to determine a visual focus of the user in relation to the video content, and wherein the identifying of the particular portion of the subsequent frames of the plurality of frames comprises identifying the particular portion of the subsequent frames of the plurality of frames according to the visual focus of the user in relation to the video content.

3. The device of claim 2, wherein the facial feature of the user comprises at least one eye of the user, and wherein the monitoring comprises monitoring, by the image sensor, a pupil of the at least one eye of the user.

4. The device of claim 2, wherein the image sensor comprises a camera sensor.

5. The device of claim 1, wherein the operations comprise:
identifying a first group of frames of the plurality of frames and identifying a second group of frames of the plurality of frames, wherein the first group of frames includes a first group of moving objects, wherein the second group of frames includes a second group of moving objects; and
determining the first group of moving objects in the first group of frames is fewer than the second group of moving objects in the second group of frames resulting in an object determination.

6. The device of claim 5, wherein the identifying of the particular portion of the subsequent frames of the plurality of frames comprises identifying the particular portion of the subsequent frames of the plurality of frames according to the object determination.

7. The device of claim 5, wherein the particular portion of the subsequent frames comprises a portion of the first group of frames.

8. The device of claim 1, wherein the operations comprise:
determining a third group of frames of the plurality of frames associated with the viewpoint trajectory; and
determining a measure of attention of the user within a portion of the third group of frames, wherein the identifying of the particular portion of the subsequent frames of the plurality of frames comprises identifying the particular portion of the subsequent frames of the plurality of frames in response to determining that the measure of attention satisfies a threshold.

9. The device of claim 8, wherein the determining of the measure of attention of the user comprises performing user attention analysis on the third group of frames.

10. The device of claim 9, wherein the performing of the user attention analysis comprises performing video user attention analysis or performing audio user attention analysis.

11. The device of claim 1, wherein the video content comprises panoramic video content.

12. The device of claim 1, wherein the communication device comprises a virtual reality headset, wherein the performing the second determination that the viewpoint has been adjusted to the second region of the first frame is responsive to the detecting the change in viewpoint, wherein the operations further comprise performing a third determination that the particular portion of the subsequent frames does not include an object determined to be a distraction, performing a fourth determination, based on audio analysis, that the particular portion of the subsequent frames does not include noise above a particular level, and wherein the identifying the particular portion of the subsequent frames to insert the visual advertisement is further according to the third determination and also according to the fourth determination.

13. A non-transitory, machine-readable medium, comprising executable instructions that, when executed by a processing system including a processor, facilitate performance of operations, the operations comprising:

obtaining video content that comprises a plurality of frames;

determining a viewpoint trajectory in response to detecting a change in viewpoint by a user in viewing the video content;

monitoring, by an image sensor, a facial feature of the user to determine a visual focus of the user in relation to the video content;

performing a first determination that a first region of a first frame of the plurality of frames comprises a determined high user attention region;

during a presentation of the first frame, performing a second determination that the viewpoint has been adjusted to a second region of the first frame that comprises a determined low user attention region;

identifying a particular portion of subsequent frames of the plurality of frames to insert a visual advertisement according to the viewpoint trajectory, according to the first determination, according to the second determination, and also according to the visual focus, wherein the particular portion of the subsequent frames corresponds to the second region of the first frame, and wherein a different portion of the subsequent frames corresponds to the first region of the first frame; and embedding the visual advertisement in the particular portion of the subsequent frames of the plurality of frames such that the visual advertisement is embedded in a determined low user attention region and not in a determined high user attention region, wherein the subsequent frames, including the different portion and the visual advertisement in the particular portion, are presented on a communication device associated with the user.

14. The non-transitory, machine-readable medium of claim 13, wherein the facial feature of the user comprises at least one eye of the user, and wherein the monitoring comprises monitoring, by the image sensor, a pupil of the at least one eye of the user.

15. The non-transitory, machine-readable medium of claim 13, wherein the image sensor comprises a camera sensor, wherein the performing the second determination that the viewpoint has been adjusted to the second region of the first frame is responsive to the detecting the change in viewpoint, wherein the operations further comprise performing a third determination that the particular portion of the subsequent frames does not include an object determined to be a distraction, performing a fourth determination, based on audio analysis, that the particular portion of the subsequent frames does not include noise above a particular level, and wherein the identifying the particular portion of the subsequent frames to insert the visual advertisement is further according to the third determination and also according to the fourth determination.

16. The non-transitory, machine-readable medium of claim 13, wherein the video content comprises panoramic video content.

17. The non-transitory, machine-readable medium of claim 13, wherein the communication device comprises a virtual reality headset.

18. A method, comprising:

obtaining, by a processing system including a processor, video content that comprises a plurality of frames;

determining, by the processing system, a viewpoint trajectory in response to detecting a change in viewpoint by a user in viewing the video content;

performing, by the processing system, a first determination that a first region of a first frame of the plurality of frames comprises a determined high user attention region;

during a presentation of the first frame, performing, by the processing system, a second determination that the viewpoint has been adjusted to a second region of the first frame that comprises a determined low user attention region;

identifying, by the processing system, a particular portion of subsequent frames of the plurality of frames to insert a visual advertisement according to the viewpoint trajectory, according to the first determination, and also according to the second determination, wherein the particular portion of the subsequent frames corresponds to the second region of the first frame, and wherein a different portion of the subsequent frames corresponds to the first region of the first frame; and embedding, by the processing system, the visual advertisement in the particular portion of the subsequent frames of the plurality of frames such that the visual advertisement is embedded in a determined low user attention region and not in a determined high user attention region, wherein the subsequent frames, including the different portion and the visual advertisement in the particular portion, are presented on a communication device associated with the user.

19. The method of claim 18, wherein the performing the second determination that the viewpoint has been adjusted to the second region of the first frame is responsive to the detecting the change in viewpoint, wherein the method further comprises performing a third determination that the particular portion of the subsequent frames does not include an object determined to be a distraction, performing a fourth determination, based on audio analysis, that the particular portion of the subsequent frames does not include noise above a particular level, and wherein the identifying the particular portion of the subsequent frames to insert the visual advertisement is further according to the third determination and also according to the fourth determination.

20. The method of claim 18, wherein the communication device comprises a virtual reality headset.

* * * * *